(12) United States Patent
McRae

(10) Patent No.: US 12,063,451 B2
(45) Date of Patent: Aug. 13, 2024

(54) MODIFICATION OF CAMERA FUNCTIONALITY BASED ON ORIENTATION

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 17/891,329

(22) Filed: Aug. 19, 2022

(65) Prior Publication Data
US 2023/0056104 A1 Feb. 23, 2023

Related U.S. Application Data

(60) Provisional application No. 63/235,471, filed on Aug. 20, 2021.

(51) Int. Cl.
*H04N 5/262* (2006.01)
*H04N 7/18* (2006.01)
*H04N 23/80* (2023.01)
H04N 23/667 (2023.01)

(52) U.S. Cl.
CPC ........... *H04N 5/2628* (2013.01); *H04N 7/181* (2013.01); *H04N 23/80* (2023.01); *H04N 23/667* (2023.01)

(58) Field of Classification Search
CPC ...... H04N 5/2628; H04N 7/181; H04N 23/80; H04N 23/667; H04N 7/183; G08B 3/10; G08B 13/196
See application file for complete search history.

(56) References Cited

U.S. PATENT DOCUMENTS

| | | | | |
|---|---|---|---|---|
| 8,339,422 B2 * | 12/2012 | Yamada | ................... | G06F 3/14 345/668 |
| 9,684,412 B2 * | 6/2017 | Xia | ................ | G06F 3/0488 |
| 2011/0228112 A1 * | 9/2011 | Kaheel | ................ | H04N 5/772 348/208.4 |
| 2012/0127075 A1 | 5/2012 | Kholaif | | |
| 2013/0266079 A1 * | 10/2013 | Huang | ................... | H04N 19/46 375/240.26 |
| 2015/0172567 A1 * | 6/2015 | Ekeroth | ................. | H04N 23/11 348/82 |
| 2016/0277651 A1 | 9/2016 | Sherman et al. | | |
| 2018/0176541 A1 * | 6/2018 | Abbas | ..................... | H04N 23/90 |
| 2018/0367739 A1 * | 12/2018 | Messely | .................... | G06T 7/80 |
| 2019/0114807 A1 * | 4/2019 | Saa-Garriga | .............. | G06T 9/00 |
| 2019/0304408 A1 * | 10/2019 | Seethaler | .................. | G06T 7/73 |

* cited by examiner

*Primary Examiner* — Hung H Lam
(74) *Attorney, Agent, or Firm* — Boyle Fredrickson S.C.

(57) ABSTRACT

A method and system are disclosed for tailoring the functionality of a monitoring system based on an identified orientation of an imaging device, typically a digital camera. The imaging device is wirelessly communicable with one or more base stations and/or access points over a WLAN. Captured media is processed depending on the identified orientation. The processed media is used to generate and display an image on a user device with one or more aspects of the display, such as aspect ratio or video compression rates, being dependent on the identified orientation. The size or shape of an activity zone that is monitored to trigger image capture and transmission may also be tailored to the identified orientation.

15 Claims, 5 Drawing Sheets

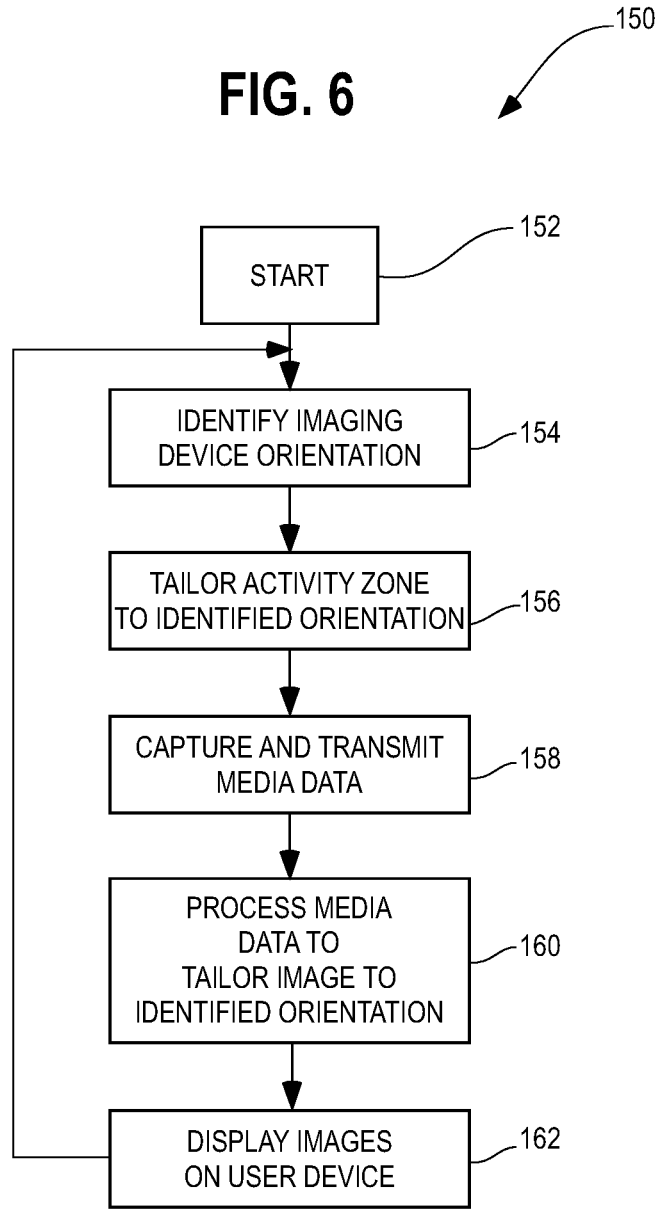

MODIFICATION OF CAMERA FUNCTIONALITY BASED ON ORIENTATION

CROSS-REFERENCE TO A RELATED APPLICATION

This application claims the benefit of provisional patent application U.S. App. No. 63/235,471, filed on Aug. 20, 2021 and entitled "Modification of Camera Functionality Based on Orientation", the entire contents of which are hereby expressly incorporated by reference into the present application.

BACKGROUND OF THE INVENTION

1. Field of the Invention

The present invention relates to a system and method of modified functionality based on the orientation of an electronic device. The present invention more particularly relates to a monitoring system including an imaging device in which operation and functionality is based on the orientation of the imaging device and the performance of the imaging device is not affected by its orientation.

2. Discussion of the Related Art

Wi-Fi™ enabled video cameras are in wide use and are often used for monitoring and security purposes. Content captured by wireless enabled cameras can be communicated over the Internet. The content can be viewed in substantially real time and/or recorded for later viewing.

Some video cameras are Wi-Fi™ enabled and battery powered. An example of such a camera is disclosed in U.S. Pat. No. 9,713,084, assigned to Arlo Technologies, Inc., the content of which is incorporated herein by reference. The wireless camera can be connected to a Wi-Fi™ enabled base station (BS) or access point (AP).

In addition to simply transmitting or recording images, video, and sound, such cameras can detect more specific visual identifiers. For instance, cameras and/or monitoring systems incorporating them, have become equipped with computer vision (CV) software with facial recognition that permits the identification of an individual based on specific characteristics of the individual's facial features. CV also can be used to identify other objects such as vehicles, packages, etc. The transmission of images and video, as well as specific visual identifiers, are dependent on the image sensors that determine the field of view or coverage of the camera.

In order to determine the field of view, previous cameras and/or associated monitoring systems include image sensors that capture images at an aspect ratio of approximately 16:9, which fixes a relatively wide horizontal viewing angle, but a relatively narrow vertical viewing angle. Additionally, sensors fixed at a certain effective angle cause image rotation from portrait to landscape orientation or other orientation changes that affect the performance of the camera. Some cameras and/or associated monitoring systems have tried to solve the problem by using a 1:1 aspect ratio image sensor to balance horizontal and vertical viewing angles. A 1:1 aspect ratio, however, only provides a medium field of view, both horizontally and vertically.

A need therefore exists for cameras that may be used in either a horizontal (landscape) or vertical (portrait) orientation, allowing for rotation or other changes in orientation to occur without affecting the performance of the camera.

SUMMARY OF THE INVENTION

In one aspect, a method of using an imaging device or monitoring device including a camera that can capture images in at least two orientations (e.g., a horizontal or vertical orientation) is disclosed. The imaging device can detect and identify an imaging device's orientation and adjust its functionality to accommodate the prevailing orientation.

The method includes capturing media through the camera and, using a controller, identifying an orientation. The orientation may be identified, for example, through kinematics or other positional inference analysis, by comparing the captured media to a database of known orientation identifiers, and/or by user orientation selection. Once an orientation is determined, the monitoring system can automatically react to the orientation in a designated manner. The designated manner of reaction may, for example, be adjusting the monitored area by switching between motion detectors or other sensors and/or by adjusting the size and shape of an activity zone that is monitored. As another example, the system may optimize video compression and/or aspect ratios of the image ultimately displayed on the user device based on the detected orientation.

Another aspect of the present invention provides a monitoring system having a wireless network including a base station and at least one, and typically several, imaging devices connected to one another, and possibly to an external server, via WI-FI or the like. The system includes a controller including a memory that stores a database of orientation identifiers, as well as an orientation module and a trigger module. The orientation module includes instructions, that when executed by a processor, identify the imaging device's orientation. The trigger module includes instructions to execute a task to tailor system operations to the prevailing orientation of the imaging device. For example, the instructions may include changing which detector(s) are used and/or optimizing video compression and aspect ratios.

In yet another aspect of the invention, the monitoring system includes an imaging device that is in communication with a controller and that is configured to capture and transmit images. The controller is configured to execute a program, stored in non-transitory memory, that identifies an orientation of the imaging device, processes media captured by the imaging device in a manner dependent upon the identified orientation, and uses the processed data to cause an image to be displayed on a user device with one or more aspects of the display being dependent on the identified imaging device orientation.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 6 is a flowchart of a method of operating the imaging device of FIG. 2.

DETAILED DESCRIPTION

Figure 1:
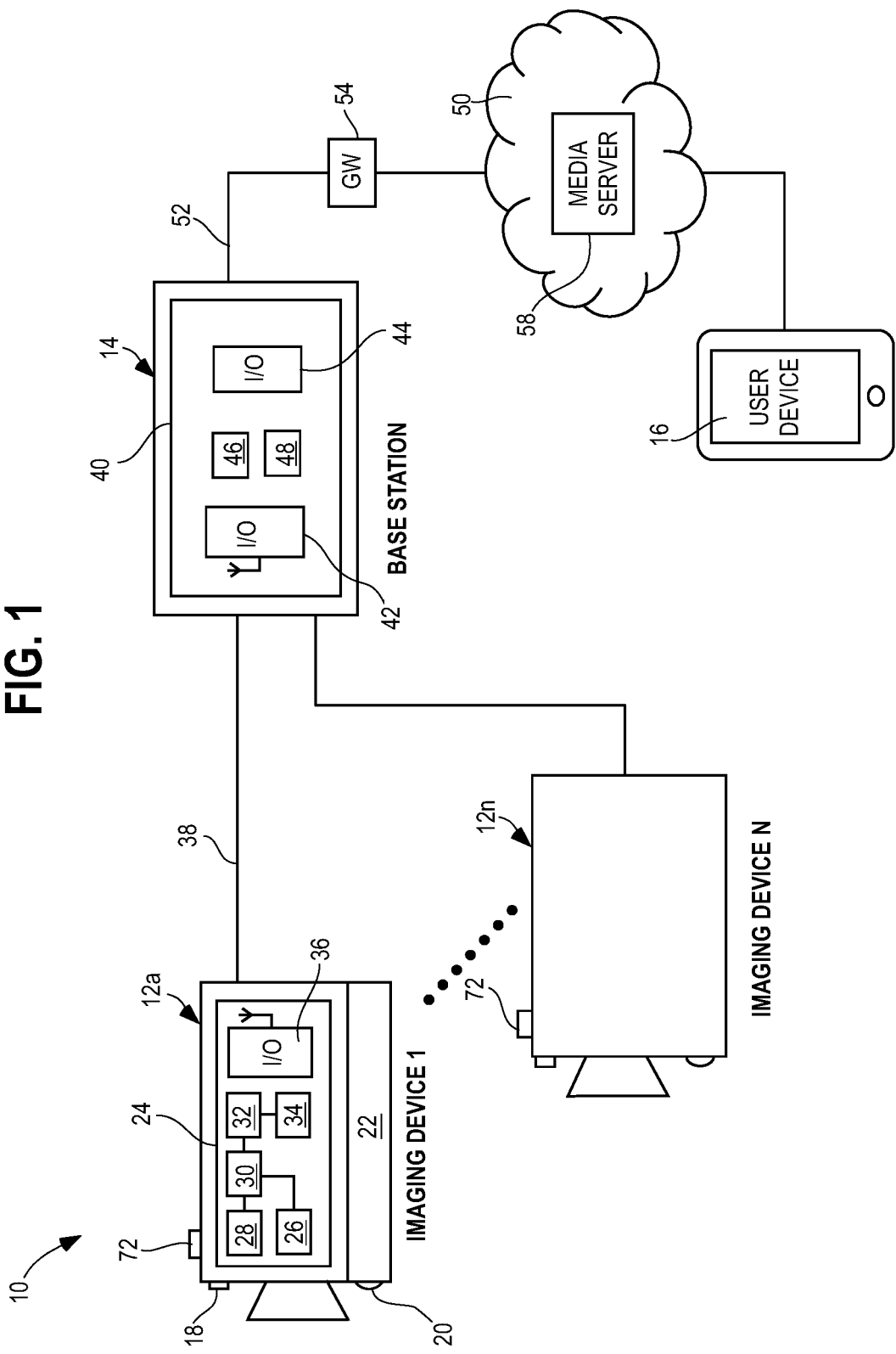
FIG. 1 is a schematic representation of a monitoring system according to aspects of the invention.

Referring now to FIG. 1, in accordance with an aspect of the invention, an electronic system 10 for real-time monitoring can include one or more imaging devices 12 and a hub or base station 14. A number "n" 12a-12n of imaging devices are schematically illustrated in FIG. 1. Unless otherwise specified, reference to an "imaging device 12" will apply equally to all imaging devices 12a-12n. One or more user devices 16, such as a smart phone, tablet, laptop, or PC, communicates with the base station 14. Each user device 16 includes a display that typically includes: both an audio display and a video display, internal computing and storage capabilities, and a program or application servicing as a user interface with the remainder of the system 10. In the case of a smart phone, the display typically will include a touch screen and a speaker.

Each imaging device 12 is configured to acquire data and to transmit data to the base station 14 for further processing and/or transmission to a server and/or the user device(s) 16. Each imaging device 12 may be battery powered or wired. The acquired data typically will correspond to a video image, and each imaging device 12 may be or include a camera such as a video camera 24. Several such imaging devices may be mounted around a building or other structure or area being monitored. For example, in the case of a residential home, imaging devices 12 could be mounted by each entrance and selected windows, and even on a gate or light pole. An imaging device 12 also could be incorporated into or coupled to a doorbell, floodlight, etc.

Still referring to FIG. 1, one or more of the imaging devices 12 may also include a microphone 18, visible and/or infrared (IR) lights 20, a power supply 22, and/or imaging device electronic circuitry 24. Circuit 24 may include an imager 26, an audio circuit 28, a media encoder 30, a processor 32, a non-transient memory storage device 34, a wireless I/O communication device or radio 36, among other things. Each imaging device 12 can communicate with the base station 14 through a network, such as a private Wireless Local Area Network (WLAN) 38, hosted by the base station 14 operating as an access point. One such network is an IEEE 802.11 network.

Still referring to FIG. 1, the hub or base station 14 can include base station electronic circuitry 40 including a first wireless I/O communication device or radio 42 for communicating with the imaging devices 12 over the WLAN 38; a second wired or wireless I/O communication port, device, or radio 44 for accessing the Wide Area Network (WAN) 50, such as the Internet through a Local Area Network (LAN) 52 connected to a Gateway and/or Router 54; a processor 46; and/or a non-transient memory storage 48, among other things. The base station 14 also could be combined with router 54 or another device in a single module, which would still be considered a "base station" within the meaning of the present disclosure. It should be apparent that "circuitry" in this regard can comprise hardware, firmware, software, or any combination thereof. In one aspect, the imaging devices 12 could be Arlo® cameras, and the base station 14 could be an Arlo base station, each available on a stand-alone basis or as part of any of a number of systems available from Arlo Technologies, Inc. of Carlsbad, California.

The base station 14 may also be in communication with a sever 58, which may be a cloud-server accessible via the WAN 50. The server 58 can include or be coupled to a microprocessor, a microcontroller or another programmable logic element (individually and collectively considered "a controller") configured to execute a program. Alternatively, interconnected aspects of the controller and the programs executed by it could be distributed in various permutations within the imaging device 12, the base station 14, the user device 16, and/or the server 58. This program may be utilized in filtering, processing, categorizing, storing, recalling, and transmitting data received from the imaging device 12 via the base station 14.

This program, while operating at the server level, may be utilized in filtering, processing, categorizing, storing, recalling, and transmitting data received from the imaging device 12 via the base station 14. Server 58 may also be in communication with or include a computer vision program ("CV"), which can apply one or more filters or processes, such as edge detection, facial recognition, motion detection, etc., to one or more detected characteristics of the recording. The CV thus may perform functions such as, but not limited to, identifying an individual, animal, vehicle, or package present in the recording.

In operation, each imaging device 12 can be configured, through suitable mounting of the imaging device 12 and/or through suitable manipulation of its controls, to monitor an area of interest, such as a part of a building or section of property. An imaging device 12 may capture an image automatically upon detection of a triggering event by a detector and/or upon receipt of a command from a user device 16. The triggering event may be motion; and the detector may be an image-based motion detector, at least one PIR sensor, radar, or other motion detector. Instead of or in addition to detecting motion, the detector could include at least one infrared IR sensor detecting heat, such as the body heat of an animal or person. In one embodiment, the imaging device 12 may include at least two detectors or two sensors (or two sets if the detector or sensor comes in a set). The triggering event also could be sound, in which case the detector may include the microphone 18. In this case, the triggering event may be a sound exceeding a designated decibel level or some other identifiable threshold. Upon receiving a notification from an imaging device 12 of the detection of a triggering event, the system 10 can generate an alert such as a push notification ("PN") and send it to one or more user devices 16 to indicate the triggering event.

Regardless of whether camera operation is triggered by a command from a user device 16 or by detection of a triggering event, the camera 24 can then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the processor 32 executing the program, the encoded media stream can be transmitted from the wireless I/O communication device 36 to the base station 14.

The media stream may then be transmitted via the WAN 50 to a remote data storage device in communication with media server 58 for data storage and processing. The storage device may be a cloud-based storage device, and the media sever 58 may be a cloud server accessible via a wireless connection. The CV that is in or accessible by the server 58 then can apply one or more filters or processes, such as edge detection, facial recognition, motion detection, etc., to detect one or more characteristics of the recording such as, but not limited to, identifying an individual, animal, vehicle, or package present in the recording. A filtered or otherwise processed image can then be displayed on the user device 16, along with additional visual and/or audio messaging, such as a text and/or audio message identifying a generic or particular person or object.

Figure 2:
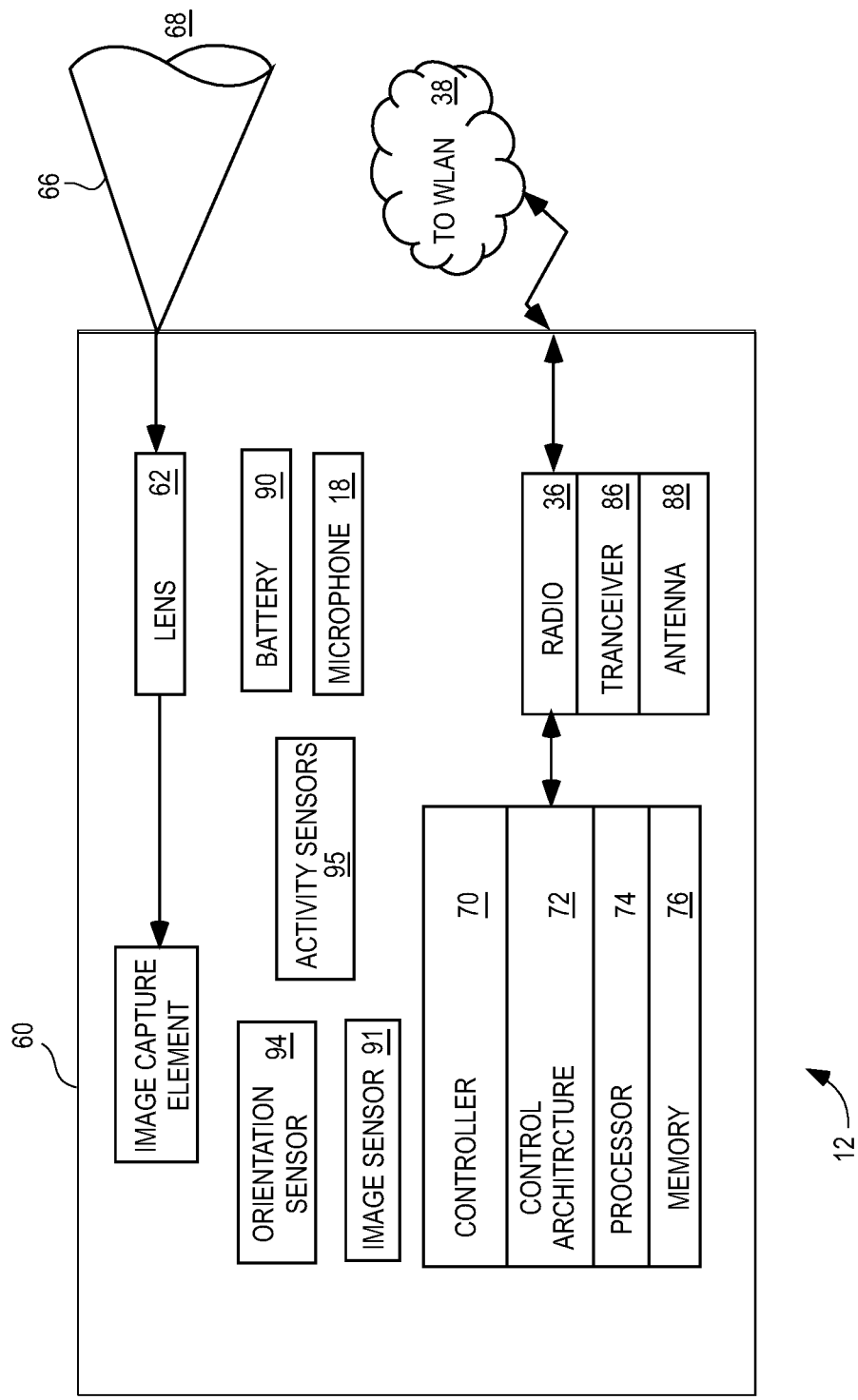
FIG. 2 is a block diagram representing an imaging device shown in FIG. 1.

FIG. 2 represents an example of an imaging device 12 shown in FIG. 1. In the illustration, the imaging device 12 has a housing 60 for enclosing and protecting the various camera components illustrated as blocks in FIG. 2. The imaging device 12 includes a lens 62 and an image capture element (or primary sensor) 64. The image capture element 64 can be any suitable type of image capturing device or sensor; including, for example, an area array sensor, a Charge Coupled Device (CCD) sensor, a Complementary Metal Oxide Semiconductor (CMOS) sensor, or a linear array sensor, just to name a few possibilities. The image capture element 64 may capture images in suitable wavelengths on the electromagnetic spectrum. The image capture element 64 may capture color images and/or grayscale images.

The image capture element 64 determines a field of view 66 of the imaging device 12, which extends radially from the outwardly facing lens 62. The field of view 66 is a portion of the environment 68 within which the imaging device 12 can detect electromagnetic radiation via the lens 62 and image capture element 64. The field of view 66 typically is rectangular or otherwise has an aspect ratio other than 1:1 Typical aspect ratios include, but are by no means limited to, 16:9, 16:10 and 4:3.

The camera of the imaging device 12 is configured to capture images. An image is a digital representation of a scene for the environment 68 as captured by the camera. Capturing an image refers to the act of obtaining and recording an image data file or stream of the digital representation. The scene is the portion of the environment 68 observed through the field of view 66. Capturing a plurality of images in a timed sequence can result in a video. Capturing a video refers to the act of obtaining and recording a video data file or stream of the digital representation. Still referring to FIG. 2, the imaging device 12 has a controller 70 including a control architecture 72 having a processor 74 and a memory 76. Of course, the controller 70 could similarly have multiple processors, such as dual processors and accompanying memory.

The processor 74 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry. The processor 74 can include a hardware circuit (e.g., an integrated circuit) configured to carry out instructions contained in program code.

The memory 76 stores one or more types of instructions and/or data. The memory 76 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 76 can be a component of a processor, can be operatively connected to a processor for use thereby, or a combination of both. The memory 76 can include various instructions stored thereon. For example, the memory 76 can store one or more modules. Modules can be or include computer-readable instructions that, when executed by a processor, cause a processor to perform the various functions disclosed herein. While functions may be described herein for purposes of brevity, it is noted that the functions are performed by the processor 74 using the instructions stored on or included in the various modules described herein. Some modules may be stored remotely and accessible by a processor using, for instance, various communication devices and protocols.

The imaging device 12 communicates wirelessly (e.g., with the base station 14) via the radio 36. An example of a radio is a wireless local area network (WLAN) radio. With a WLAN radio 36, the imaging device 12 generally communicates over a short-range wireless communication network, such as the WLAN 38. In one implementation, the radio 36 includes a transceiver 86 for transmitting and receiving signals to and from the base station 14 via an antenna 88. The transceiver 86 can be separate to or part of the control architecture 72. The wireless communication can be as prescribed by the IEEE 802.11 standards in accordance with the Wi-Fi™ communication protocol. It is appreciated, however, that the imaging device 12 can be adapted to perform communications in accordance with other known or to be developed communication protocol, or even a proprietary communication protocol developed for a particular application. Also, while only a single transceiver 86 and single antenna 88 is shown, multiple transceivers and multiple antennas can be used to communicate at multiple communication frequency bands. Alternatively, the single transceiver 86 and the single radio 36 can communicate over multiple frequency bands.

The imaging device 12 may also include a battery or battery pack 90 and numerous sensors. These sensors may include the microphone 18, one or more orientation sensors 94 for detecting the orientation of the imaging device 12, and one or more activity sensors 95 that detect activity in an activity zone to trigger image capture and transmission. The orientation sensor 94 may include a gyroscope and/or an accelerometer. The activity sensor 95 may comprise one or more motion sensors, radars, and/or passive infrared sensors (PIRs). Two or more activity sensors 95 may be arranged and controlled to tailor their monitoring to a prevailing orientation. For example, a first set of motion sensors may be operational when the imaging device is in a landscape orientation, and a second set of motion sensors may be operational when the imaging device 12 is in a portrait orientation. Though not shown, still additional sensors may be provided, such as a temperature sensor, and/or a vibration sensor.

An exemplary imaging device camera capable of incorporating aspects of the invention is an Arlo Ultra® camera available from Arlo Technologies of Carlsbad, California, US.

Before moving to other components of the system 10, it should be understood by one skilled in the art that the imaging device 12 may include any or all of additional components typically found in a wireless camera. Further discussion regarding these components is not provided herein since the components are conventional.

Figure 3:
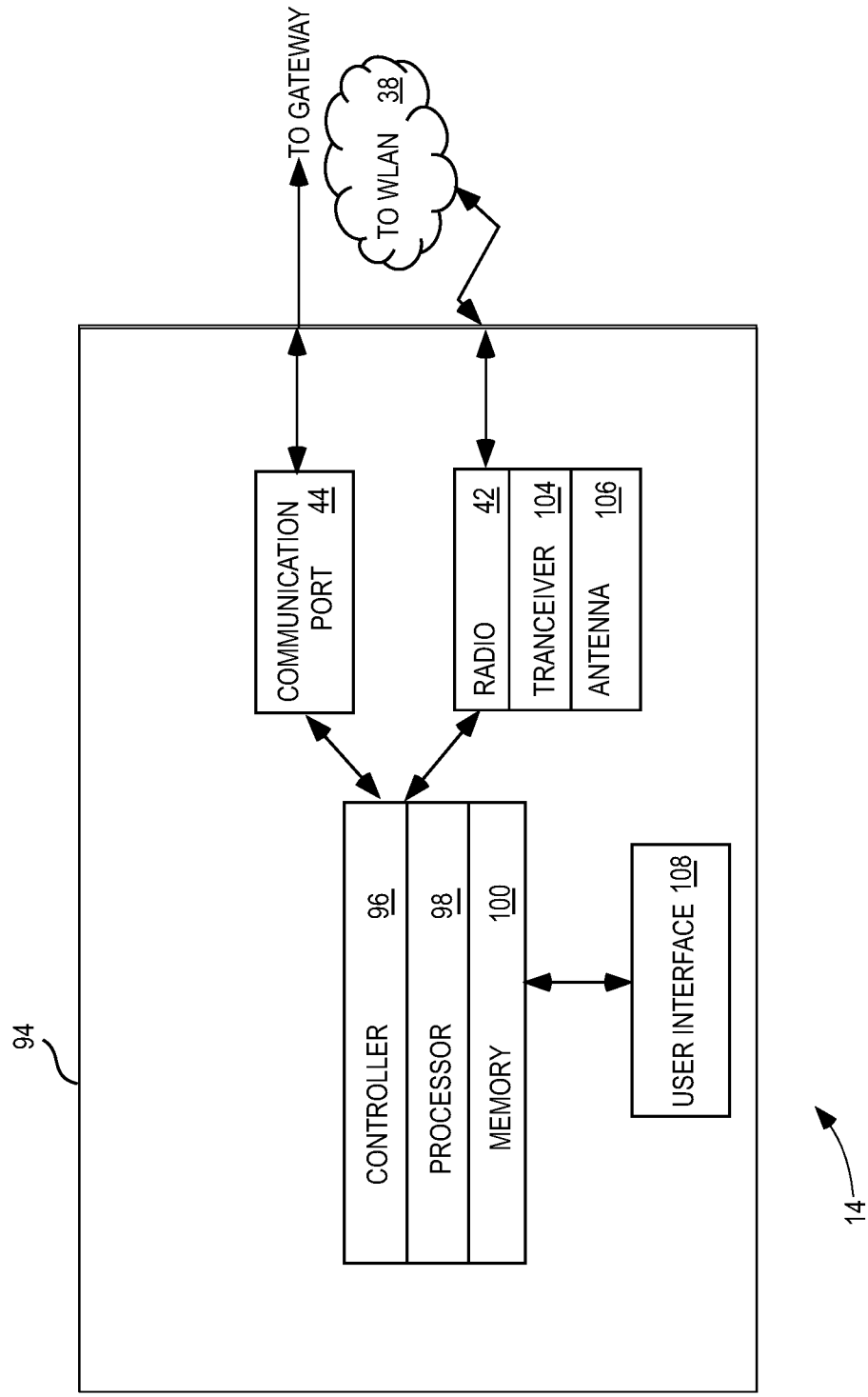
FIG. 3 is a block diagram representing a base station shown in FIG. 1.

Turning now to FIG. 3, an example of the circuitry of the base station 14 shown in FIG. 1. In the illustration, the base station 14 has a housing 94 for enclosing and protecting the various components illustrated as blocks in FIG. 3. The base station 14 has a controller 96, including a processor 98 and a memory 100. While the arrangement of FIG. 3 shows a single processor 98 and a single memory 100, it is envisioned that many other arrangements are possible. For example, multiple elements of the base station 14 can include a distinct processor and memory.

The processor 98 can include any component or group of components that are configured to execute, implement, and/or perform any of the processes or functions described herein for the base station 14 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 98 can include a hardware circuit (e.g., an integrated circuit) configured to carry out instructions contained in program code. In arrangements in which there are a plurality of processors, such processors can work independently from each other, or one or more processors can work in combination with each other.

The base station 14 includes a memory 100 for storing one or more types of instructions and/or data. The memory 100 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 100 can be a component of the processor 98, can be operatively connected to the processor 98 for use thereby, or a combination of both.

In one or more arrangements, the controller can include various instructions stored thereon. For example, the controller can store one or more modules. Modules can be or include computer-readable instructions that, when executed, cause the processor 98 to perform the various functions disclosed for the module. While functions may be described herein for purposes of brevity, it is noted that the functions are performed by the processor 98 or another portion of the controller using the instructions stored on or included in the various modules. Some modules may be stored remotely and accessible by the processor 98 or another portion of the controller using, for instance, various communication devices and protocols.

The base station 14 communicates wirelessly (e.g., with the imaging devices 12) via the radio 42. An example of a radio includes a wireless local area network (WLAN) radio. With the WLAN radio 42, the base station 14 generally communicates over a short-range wireless communication network, such as the WLAN 38. In one implementation, the radio 42 includes a transceiver 104 for transmitting and receiving signals to and from the base station 14, via an antenna 106. The transceiver 104 can be separate to or part of the controller 96. The wireless communication can be as prescribed by the IEEE 802.11 standards in accordance with the Wi-Fi™ communication protocol. It is appreciated, however, that the base station 14 can be adapted to perform communications in accordance with other known or to be developed communication protocol, or even a proprietary communication protocol developed for a particular application. Also, while only a single transceiver 104 and single antenna 106 is shown, multiple transceivers and multiple antennas can be used to communicate at multiple communication frequency bands. Alternatively, the single transceiver 104 and the single radio 42 can communicate over multiple frequency bands.

The base station 14 may include a user interface 108. The user interface 108 can include an input apparatus and an output apparatus. The input apparatus includes a device, component, system, element, or some arrangement or grouping thereof that enables information/data to be entered into the base station 14 from a user. The output apparatus includes any device, component, or arrangement or grouping thereof that enables information/data to be presented to the user. The input apparatus and the output apparatus can be combined as a single apparatus, such as a touch screen commonly used by many electronic devices.

The base station 14 includes the communication port 44, which is configured to provide a communication interface between a larger computer network, such as the Internet via the gateway 54.

In one construction, since the base station 14 is powered by an enduring power source (e.g., power outlet), it is not necessary for the base station 14 to be operated in a default sleep mode, although this is not precluded. An exemplary base station capable of incorporating aspects of the invention is an Arlo SmartHub® base station available from Arlo Technologies of Carlsbad, California, US.

Figure 4:
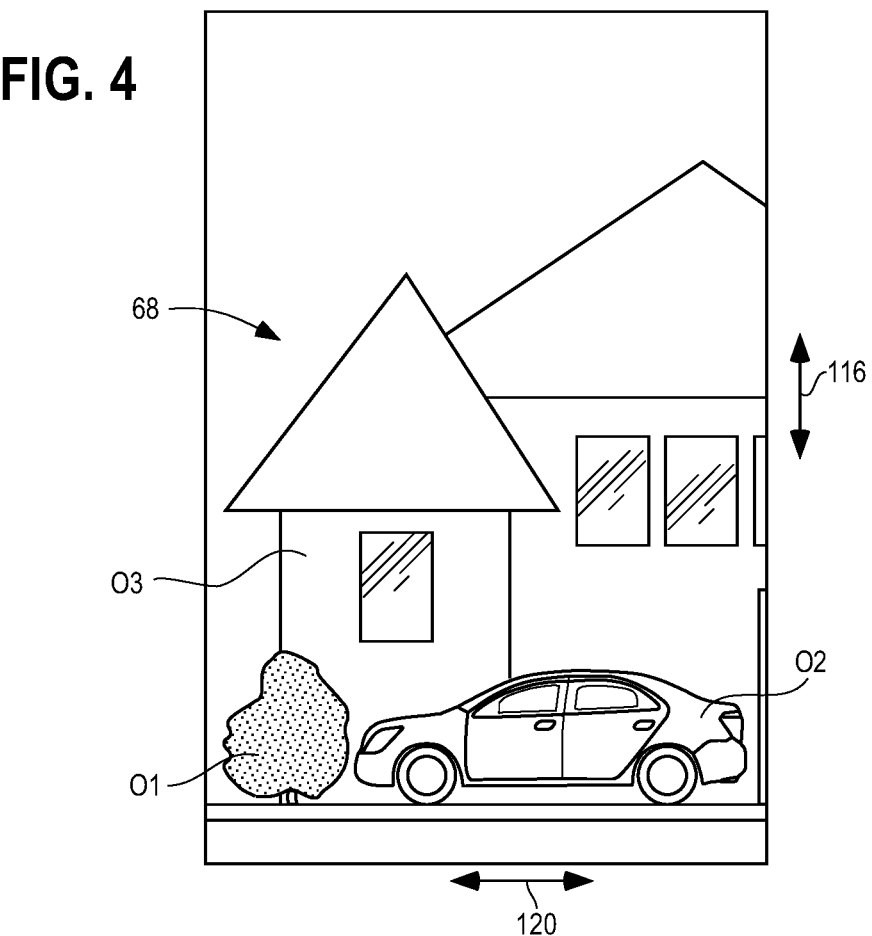
FIG. 4 is an illustration of a field of view of the imaging device shown in FIGS. 2 and 3 when the imaging device is orientated vertically.
Figure 5:
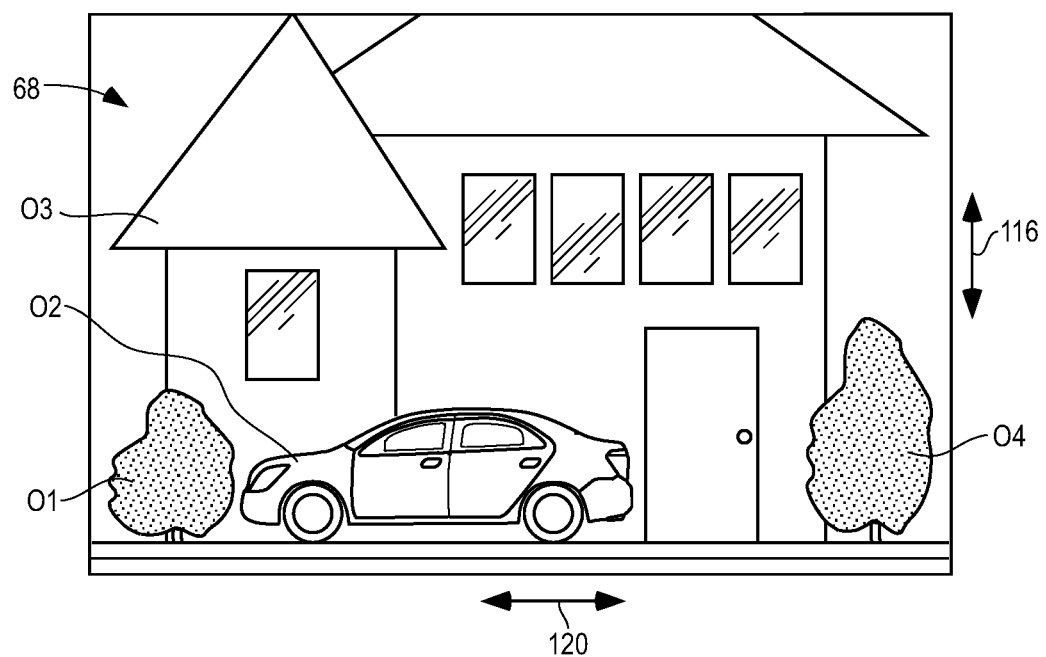
FIG. 5 is an illustration of the field of view of the imaging device of FIGS. 2 and 3 when the imaging device is orientated horizontally.

As mentioned, the system 10 is capable of adjusting operation based on the orientation of the imaging device 12. In one possible mode of operation, the imagining device 12 may be placed in a vertical or portrait orientation, such that the field of view 66 has a wide viewing angle or range in the first direction or vertical direction 116 and a narrow viewing angle or range in the second direction or horizontal direction 120 (shown in FIG. 4), at a location and orientation to provide optimal viewing the environment 68. Alternatively, the imaging device 12 may be placed in a horizontal or landscape orientation e, where the field of view 66 has a narrow viewing angle or range in the first direction or vertical direction 116 and wide viewing angle or range in the second direction or horizontal direction 120 (shown in FIG. 5), also at an orientation to provide optimal viewing the environment 68. For example, a vertically orientated imaging device 12 may be placed at a front door or within a hallway to capture a narrow field of view 66 horizontally and a wide field of view 66 vertically; while a horizontally orientated imaging device 12 may be placed above a garage door to capture a wide field of view 66 horizontally and a narrow field of view 66 vertically. As one example, images generated by the imaging device 12 may effectively have a 16:9 (width by height) aspect ratio when in a landscape orientation and a 9:16 aspect ratio when in a portrait orientation. The differences between the resulting images can be appreciated by comparing FIG. 4 with FIG. 5. Two objects, a bush O1 and a vehicle O2, are fully visible in both views, albeit at different locations within the frame. Different portions of a third object, a house O3, are visible in each respective view. Finally, another object, a bush O4, is visible in the landscape view of FIG. 5 but not the portrait view of FIG. 4.

If configured to determine its own orientation, the system 10 determines the orientation of the imaging device 12 through sensors, computer algorithms, and/or the selection by a user. As mentioned above, the imaging device 12 may further include an orientation sensor, such as a gyroscope, that automatically and dynamically senses the orientation of the imaging device 12. Instead of or in addition to relying on a gyroscope or other physical sensor, the imaging device's orientation can be identified through computer algorithms that analyze incoming media. The analysis may be used without reference to a stored database and use kinematics and other positional analysis. Alternatively, or additionally, a controller may store a database containing orientation identifiers, an orientation module, an identifier module, and/or a trigger module. As mentioned above, this controller may be contained in whole or in part in the controller 70 of the imaging device 12, the controller 96 of the base station 14, the controller of the external server 58, the controller of the user device 16, and/or another controller entirely. The imaging device 12 transmits images and/or videos, which can then be reviewed by the CV. The CV can identify people, animals, or objects in the images and/or videos. The CV then can compare any such images and/or videos to a database of known orientation identifiers.

Orientation identifiers include images of the environment 68 such as household objects, outdoor objects, people, or animals; as well as the typical orientation of those objects, people, or animals. Potential objects that may be identified include trees, sidewalks, roads, cars, tables, couches, or chairs. The orientation module includes instructions, that when executed by the processor, compares a plurality of images captured by the imaging device 12 to the database of images or orientation identifiers. The trigger module 100 includes instructions to execute a task such as confirming or changing the orientation of the imaging device 12 to allow the imaging device 12 and system 10 to tailor their operation and function to optimize image capture and image display on the user device.

Alternatively, the controller may include an identifier module which compares a plurality of images captured by the imaging device 12 to a database of user-selected orientation identifiers. In other words, incoming or captured images or videos by the imaging device 12 may be saved for future review by the user of a device 16, where the user can then define and set the orientation of the captured images. The saved images and videos, having a user-set orientation, are then compared to the incoming images and video to determine the orientation of the imaging device 12. In another embodiment, the user may select an orientation through a user interface on the user device 16 or a switch on the imaging device.

In yet another alternative possible implementation that may be used instead of or in addition to one or more the ones described above, users may initially set the orientation of each imaging device 12 through the user interface on a user device 16 or a through a switch on the imaging device 12.

Depending on the orientation of the imaging device 12, the controller may instruct the processor 74 of imaging device 12 to implement adjustments through its computer algorithm so that data is received from one of the at least two sensors or detectors (or sets) in order to adjust the size and/or shape of the activity zone that is monitored to trigger image capture and transmission by the imaging device 12. The first sensor (or first sensor set) may be employed such that it is used when the imaging device 12 is placed within a vertical or portrait orientation, and the second sensor (or second sensor set) is used when the imaging device 12 is placed or positioned in a horizontal or landscape orientation. The orientation of the imaging device 12 may further affect the activity zone or area of interest within the field of view 66, whereas the computer algorithm may also adjust to the activity zone.

The positioning or orientation of the imaging device 12 also effects the image analysis using the CV. The CV may operatively apply one or more filters or processes (e.g., edge detection, facial recognition, motion detection, etc.) to detect one or more characteristics of the recording such as, but not limited to, identifying an individual, animal, vehicle, or package present in the recording within the area of interest or desired area within the field of view 66. Thus, in addition to adjusting the size and/or shape of activity zone, the computer algorithm also adjusts its image analysis so that the imaging device 12 (and system 10) are tailored to the orientation of the imaging device 12. Once the orientation has been identified and other parameters are set, the imaging device 12 may capture an image automatically upon detection of a triggering event and/or upon receipt of a command from the user device 16 as described above.

Furthermore, the controller may also implement changes to a video compression algorithm and/or aspect ratio so that the captured images and videos are undistorted despite a change in orientation of the imaging device 12. The thus controller may select the appropriate video compression and/or aspect ratio for either the portrait mode or landscape mode, optimized for the current orientation of the imaging device 12. Thus, images from an imaging device 12 that has been placed in a vertical orientation may be viewed in portrait mode on a user device 16, while images from an imaging device 12 that has been placed in a horizontal orientation may be viewed in landscape mode on a user device 16. The system 10 and imaging devices 12 therefore may be used in a variety of environments, and the orientation of the imaging devices 12 can be optimized for a better field of view 66 depending on the desired area of interest, while the functionality and operation of the system 10 remains unchanged.

One detailed implementation for using an imaging device 12, regardless of its orientation, is shown by the process 150 illustrated schematically in FIG. 6. The process 150 proceeds from Start at block 152 to block 154, wherein the orientation of the imaging device 12 is identified. This orientation typically will be either one configured to operate in landscape mode or one to operate in portrait mode. As mentioned above, this identification may involve nothing more than manually selecting a particular orientation using, for example, a user interface of the user device or even a switch on the imaging device 16. It also could involve any of the detection techniques described above. Techniques requiring analysis of acquired images using the identifier module described above would require the capture and transmission of media packets as part of the identification process.

Still referring to FIG. 6, upon identifying the orientation of the imaging device 12, the process 150 proceeds to block 156, where sensing or monitoring is tailored to the prevailing orientation. This may involve selecting a sensor or set of sensors optimized to match the size and/or shape of the activity zone to the prevailing orientation. This operation may also include matching CV to tailor object classification to the prevailing orientation. For example, if the system is configured to trigger operation only upon detection of a person, the system may be configured to tailor facial recognition capabilities to the prevailing orientation. Then, in block 158, the process 150 controls the imaging device 12 to capture and transmit images in response to detection of activity in the activity zone configured per block 156. The capture media data is then processed in block 160 in a manner tailored to the identified imaging device and orientations, such as by selecting a video compression algorithm and/or aspect ratio optimized for the prevailing orientations. The images are then displayed on the user device 16 in this orientation in block 162. The process then returns to block 154.

Accordingly, the invention provides a method and system in which one or more imaging devices may be oriented for optimized coverage without impacting the operation, functionality, and performance of the imaging device.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A method of using a monitoring system comprising:
   identifying an orientation of an imaging device as either a landscape orientation or a portrait orientation;
   tailoring operation of the imaging device to tailor a size and/or shape of a monitored activity zone to the identified orientation;
   in response to detection of activity in the activity zone, capturing media using the imaging device; and
   displaying images on a user device with one or more aspects of a display being dependent on the identified orientation.

2. The method of claim 1, wherein identifying the orientation comprises automatically detecting the orientation of the imaging device.

3. The method of claim 2, wherein the orientation is detected using a gyroscope and/or an accelerometer.

4. The method of claim 2, wherein the orientation of the imaging device is determined by comparing incoming media to a database of orientation identifiers.

5. The method of claim 1, wherein the orientation of the imaging device is set manually.

6. The method of claim 1, wherein the tailoring includes using data from a first sensor when the imaging device is in a first orientation thereof and from a second sensor when the imaging device is in a second orientation thereof.

7. The method of claim 1, wherein displaying images includes using an aspect ratio that depends upon the identified orientation of the imaging device.

8. The method of claim 1, wherein displaying images includes using a compression algorithm tailored to the identified orientation of the imaging device.

9. A monitoring system comprising:
   an imaging device configured to capture and transmit images, the image device being capable of selectively operating in a landscape mode and in a portrait mode and to capture images in either a landscape orientation or a portrait orientation; and
   a controller in communication with the imaging device, the controller configured to execute a program stored in a non-transitory memory to:
   identify an orientation of the imaging device as either a landscape orientation or a portrait orientation;
   tailor the size and/or shape of a monitored activity zone based on the identified orientation;
   in response to detection of activity in the activity zone:
   capture media using the imaging device, and
   process media captured by the imaging device in a manner that is dependent on the identified orientation; and
   using the processed media, cause an image to be displayed on a user device with one or more aspects of the displayed image being dependent on the identified orientation.

10. The monitoring system of claim 9, wherein the controller includes:
    a memory communicably coupled to the imaging device and storing a database of orientation identifiers;
    an orientation module including instructions that, when executed, compare an image captured by the imaging device to the database of orientation identifiers in an attempt to identify the orientation of the imaging device; and
    a trigger module including instructions that, when executed, execute a task that is dependent on the identified orientation.

11. The monitoring system of claim 9, wherein the controller is configured to cause the system to use data from a first sensor when the imaging device is in a first orientation thereof and from a second sensor when the imaging device is in a second orientation thereof.

12. The monitoring system of claim 9, wherein the controller is configured to cause the display of an image using an aspect ratio that depends upon the identified orientation of the imaging device.

13. The monitoring system of claim 9, wherein the controller is configured to cause the display of an image generated using a compression algorithm tailored to the identified orientation of the imaging device.

14. The monitoring system of claim 9, further comprising a base station that hosts a wireless local access network (WLAN), that is in wireless communication with the imaging device, and that is in wireless communication with an external server via a wide area network (WAN).

15. A monitoring system comprising:
    a plurality of imaging devices, each including a camera and a processor;
    a base station that hosts a wireless local access network (WLAN) and that is in wireless communication with the imaging devices and is in wireless communication with an external server via a wide area network (WAN); and
    a controller that is in communication with the imaging devices and the base station and that is configured to execute a program stored in non-transitory memory to:
    identify an orientation of at least one of the imaging devices as either a landscape orientation or a portrait orientation; and, for each imaging device for the orientation of which is detected;

cause the system to use data from a first sensor when the imaging device is in a first orientation thereof and from a second sensor when the imaging device is in a second orientation thereof to tailor a size and/or shape of a monitored activity zone to the identified orientation; and in response to detection of activity in the activity zone capture media using the imaging device,
process media captured by the imaging device in a manner that is dependent on the identified orientation, and
process media captured by the imaging device within the monitored activity zone; and using the processed media, causing an image to be displayed on a user device with an aspect ratio of the displayed image being dependent on the identified orientation.

\* \* \* \* \*